United States Patent [19]

Rosewarne et al.

[11] 4,123,075
[45] Oct. 31, 1978

[54] SLEEVE-ENCASED JAW CHUCK

[75] Inventors: William V. Rosewarne, Portage; Gerald W. Norton, Brady Township, Kalamazoo County, both of Mich.

[73] Assignee: Buck Tool Company, Kalamazoo, Mich.

[21] Appl. No.: 830,388

[22] Filed: Sep. 6, 1977

[51] Int. Cl.² ............................................. B23B 31/16
[52] U.S. Cl. .................................................. 279/121
[58] Field of Search ............... 279/121, 122, 120, 123, 279/4, 110

[56] References Cited

U.S. PATENT DOCUMENTS

| | | | |
|---|---|---|---|
| 2,845,277 | 7/1958 | Skillin | 279/121 |
| 2,854,240 | 9/1958 | Parker et al. | 279/121 |
| 2,893,744 | 7/1959 | Anthony | 279/121 X |
| 2,954,983 | 10/1960 | Roby | 279/121 |
| 3,086,784 | 4/1963 | Sloan et al. | 279/121 |
| 3,610,645 | 10/1971 | Roddy | 279/121 X |
| 3,814,451 | 6/1974 | Röhm | 279/121 |

*Primary Examiner*—Horace M. Culver

*Attorney, Agent, or Firm*—Blanchard, Flynn, Thiel, Boutell & Tanis

[57] ABSTRACT

A jaw chuck construction having an inner sleevelike body containing a plurality of radial guide grooves in which are slidably disposed jaw carriers. An actuator device is axially slidably supported within the inner body and has axially projecting wedges which cooperate with mating wedges formed on the jaw carriers for camming same radially toward or away from a workpiece. The axially projecting wedges slidably project into central slots formed in the individual jaw carriers for engaging the latter substantially centrally of the jaw carrier to minimize tilting and off-center loading of the jaw carriers. The inner body and the jaw carriers are confined by an outer sleevelike body which snugly embraces the inner body and slidably engages the outer radial surfaces of the axially projecting wedges, whereby centrifugal forces imposed on the jaw carriers are transmitted directly to the axially projecting wedges and then imposed directly on the surrounding outer body so that the centrifugal forces do not appreciably affect or reduce the gripping force between the jaws and the workpiece.

12 Claims, 8 Drawing Figures

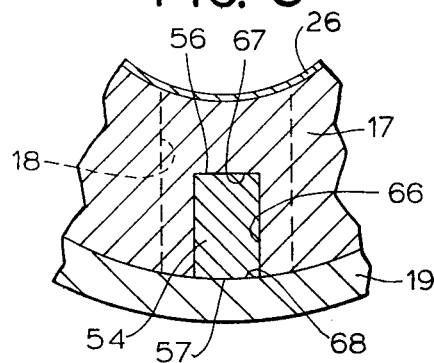
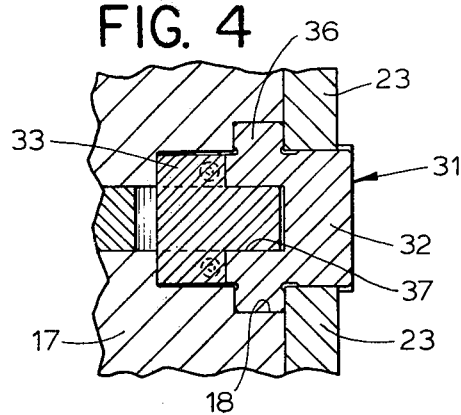
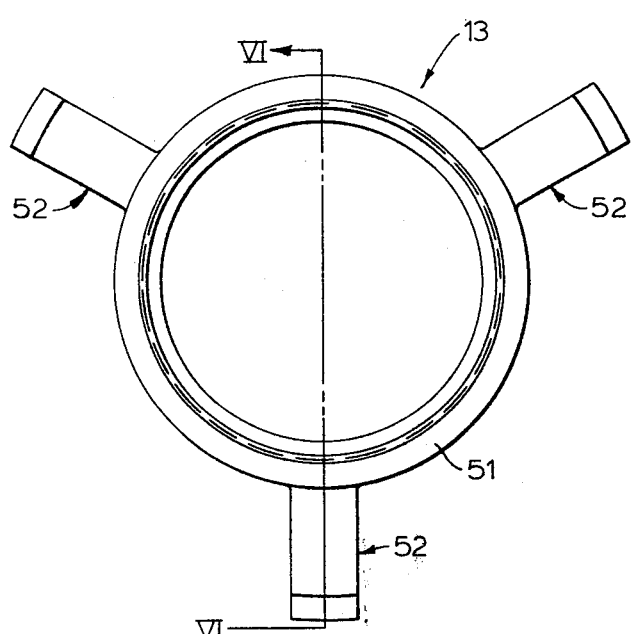
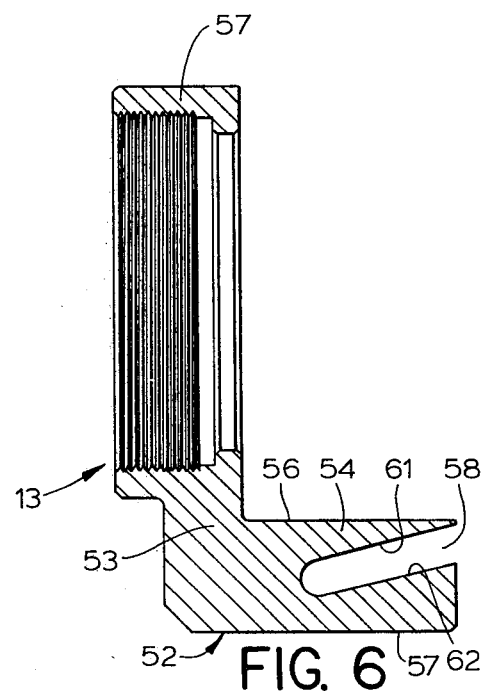
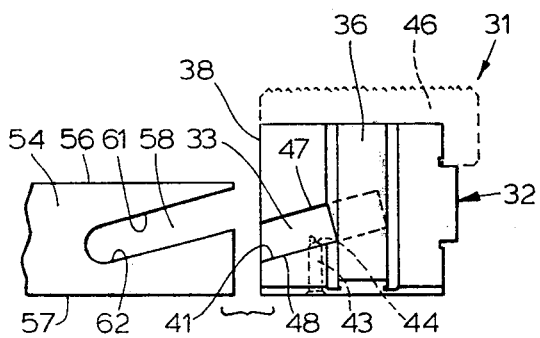
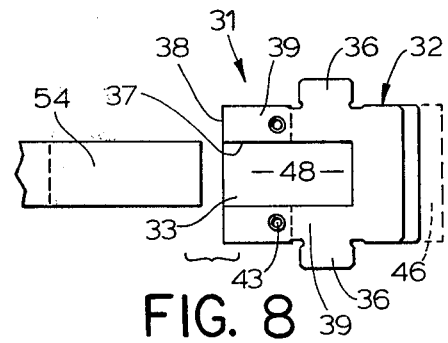

SLEEVE-ENCASED JAW CHUCK

FIELD OF THE INVENTION

This invention relates to a jaw chuck and, in particular, to a chuck which employs an outer sleevelike body for confining the jaws and the respective actuators such that the pressure of the jaws on the workpiece will remain substantially constant even though the chuck is rotated at high speeds.

BACKGROUND OF THE INVENTION

It has long been recognized that in any jaw chuck arrangement operating at other than relatively low rotative speeds, the centrifugal force developed on the jaws as rotative speeds increase may cause an appreciable change in the force by which the jaws engage the workpiece. This is particularly critical in chucks wherein the jaws are arranged for outside gripping, since centrifugal force tends to minimize the force by which the chuck grips the workpiece. This becomes particularly critical when the chuck is rotated at relatively high rotational speeds since the centrifugal force can reduce the gripping force to such an extent that, if the workpiece is subjected to substantial cutting pressure, the workpiece may slip within the chuck. Because of this, many conventional chucks often require that the operating speed be held below what would otherwise be possible, and in particular substantially below the higher operational speeds which are desired for maximum efficiency.

This problem has long been known and several types of counterbalanced chucks have been developed in an attempt to overcome the effects of centrifugal force. These known chucks have normally employed separate movable weights interconnected to the movable jaws by complex levers or other movable mechanisms. Needless to say, such balanced chucks have been undesirably complex both structurally and operationally, have normally required that the parts be manufactured with close dimensional tolerances, and have also normally required precisely constructed means for evenly applying a counterbalancing force onto each jaw. In addition, these counterbalanced chucks have normally been truly effective for only a narrow range of speeds, and tend at other speeds to distort the workpiece and/or the chuck structure to an undesirable extent.

Another disadvantage experienced with most known jaw chucks is the limited efficiency of these structures. Particularly, many known jaw chucks utilize a cam or wedge structure which coacts between the radially movable jaw carriers and the axially movable actuator for permitting force and motion transfer therebetween. This cam structure, which normally involves an angle which permits a self-locking of the jaw carrier, limits the efficiency of the force transfer from the actuator to the jaw carrier. It has been observed that most jaw chucks of this type have a maximum force transfer efficiency of approximately 50%, that is, the holding force developed by the jaw is approximately 50% of the axially directed actuating force imposed on the actuating wedge or cam. While attempts have been made to improve this efficiency, since any increase in this efficiency permits the chuck to have increased holding power, or in the alternative would permit a reduction in chuck size, nevertheless prior attempts have been unable to successfully appreciably increase this efficiency.

A further problem experienced with jaw chucks employing radial jaws activated by axially movable wedges, is the friction and wear experienced by the moving chuck parts, particularly the jaw carriers. The cooperation between the actuating wedge and the jaw carriers in the known structures result in the force being applied to the jaw carrier in such a manner as to result in imposition of substantial twisting or turning moments. These moments result in nonuniform pressure which accelerates the problem of wear or, in the alternative, tend to cause binding of the jaw carriers within their respective guiding slots.

Accordingly, it is an object of the present invention to provide an improved jaw chuck which is able to effectively overcome the problem created by centrifugal force when the chuck rotates at high rotative speeds, whereby the chuck thus overcomes the above-mentioned disadvantages. More specifically, it is an object of the present invention to provide:

1. A jaw chuck, as aforesaid, which includes a housing structure which structurally reacts with the jaw assemblies for resisting the centrifugal forces imposed on the jaw carriers when the chuck is rotated at high rotational speeds, thereby maintaining a substantially constant gripping force between the jaws and the workpiece.

2. A jaw chuck, as aforesaid, wherein the housing structure includes an inner sleevelike body on which the jaw carriers are radialy slidably supported, and an outer sleevelike body which surrounds and closely confines the inner body, which outer body slidably engages the wedgelike actuators which coact with the jaw carriers for preventing the centrifugal force imposed on the jaw carriers from causing any substantial reduction in the gripping force.

3. A jaw chuck, as aforesaid, wherein the jaw carriers are actuated by wedges which are axially slidably supported on and between the inner and outer bodies, which wedges and which outer body are both positioned directly radially outwardly from the jaw carriers to provide a positive backing therefor to counteract the centrifugal forces.

4. A jaw chuck, as aforesaid, wherein the jaw carriers and the cooperating actuating wedges coact in a manner which results in the force applied to the jaw carriers being substantially centrally positioned to thereby minimize the tilting and twisting forces imposed on the jaw carriers, and at the same time permitting a substantial increase in the percentage of force transmitted from the actuating wedge to the jaw carrier so as to result in a substantial increase in the gripping or holding power of the chuck.

5. A jaw chuck, as aforesaid, wherein the jaw carrier is of a substantially U-shaped configuration and has a central slot which extends radially therethrough and projects axially through the rearward end thereof, which central slot slidably accommodates therein the forward end of the actuating wedge to permit the force transfer between the jaw carrier and the wedge to occur within the central portion of the jaw carrier.

6. A jaw chuck, as aforesaid, wherein the jaw carrier has a centrally positioned wedge plate extending transversely across the central slot in an inclined relationship, which wedge plate coacts with a wedging slot formed in the wedge for permitting force transfer from the actuator wedge to the jaw carrier.

7. A jaw chuck, as aforesaid, wherein the wedge plate is removably mounted on the jaw carrier and hence can be replaced if it should experience substantial wear, without requiring replacement of the complete jaw carrier assembly.

Other objects and purposes of the invention will be apparent to persons acquainted with apparatus of this general type upon reading the following specification and inspecting the accompanying drawings.

BRIEF DESCRIPTION OF THE DRAWINGS

FIGS. 3 and 4 are enlarged fragmentary sectional views taken respectively along lines III—III and IV—IV in FIG. 2.

FIG. 5 is an end view of the actuator for radially displacing the jaw carriers.

FIG. 6 is a sectional veiw taken along line VI—VI in FIG. 5.

FIG. 7 is a side elevational view of the jaw carrier, and its relationship to the actuating wedge.

FIG. 8 is a bottom view of FIG. 7.

Figure 1:
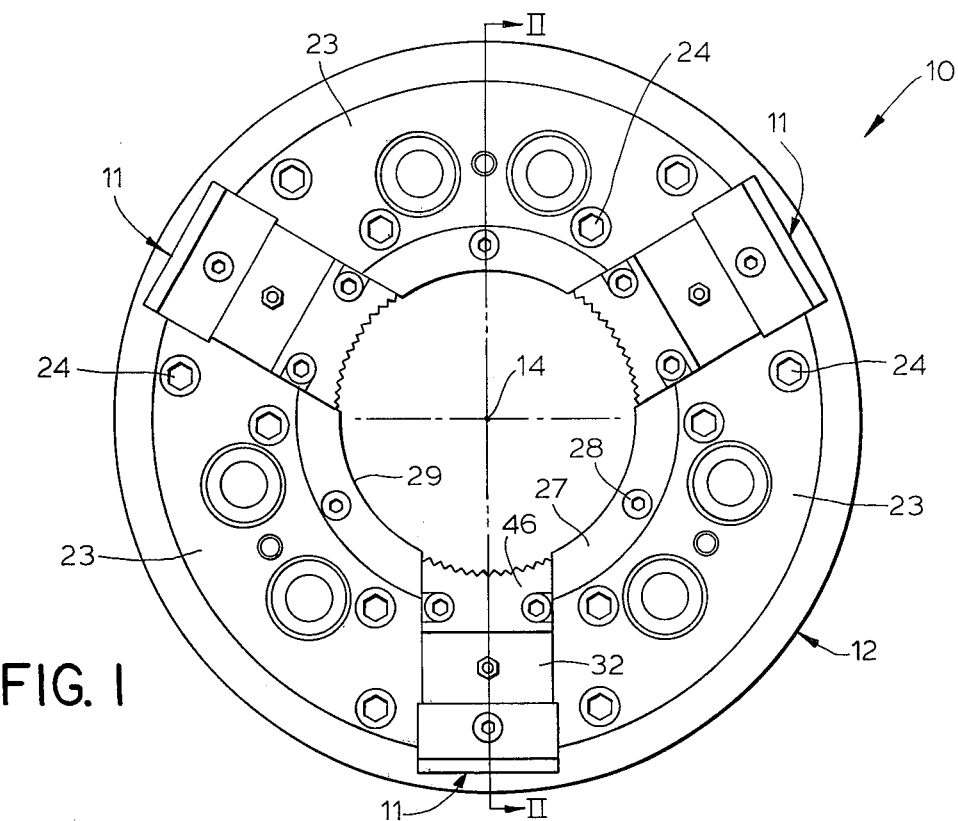
FIG. 1 is a front face view of a jaw chuck incorporating the present invention.

Certain terminology will be used in the following description for convenience in reference only and will not be limiting. For example, the words "upwardly," "downwardly," "leftwardly" and "rightwardly" will refer to directions in the drawings to which reference is made. The word "front" will have reference to the exposed face of the chuck having the jaws mounted thereon, as illustrated in FIG. 1 and the rightward face as appearing in FIG. 2. The words "inwardly" and "outwardly" will refer to directions toward and away from, respectively, the geometric center of the chuck and designated parts thereof. Said terminology will include the words specifically mentioned, derivatives thereof, and words of similar import.

SUMMARY OF THE INVENTION

The objects and purposes of the present invention are met by providing a jaw chuck having an inner sleevelike body containing therein a plurality (here three) of radial grooves in which are slidably disposed the jaw carriers. An actuator device is axially slidably supported within the inner body and has axially projecting wedges which cooperate with mating wedges formed on the jaw carriers for camming same radially inwardly toward or outwardly away from a workpiece. the axially projecting wedges slidably project into central slots formed in the individual jaw carriers for engaging the latter substantially centrally of the jaw carriers to minimize tilting and off-center loading of the jaw carriers. The inner body and the jaw carriers are confined by an outer sleevelike body which snugly embraces the inner body and slidably engages the outer radial surfaces of the axially projecting wedges, whereby centrifugal forces imposed on the jaw carriers are transmitted directly to the axially projecting wedges and then imposed directly on the surrounding outer body so that the centrifugal forces do not appreciably affect or reduce the gripping force between the jaws and workpiece.

DETAILED DESCRIPTION

Figure 2:
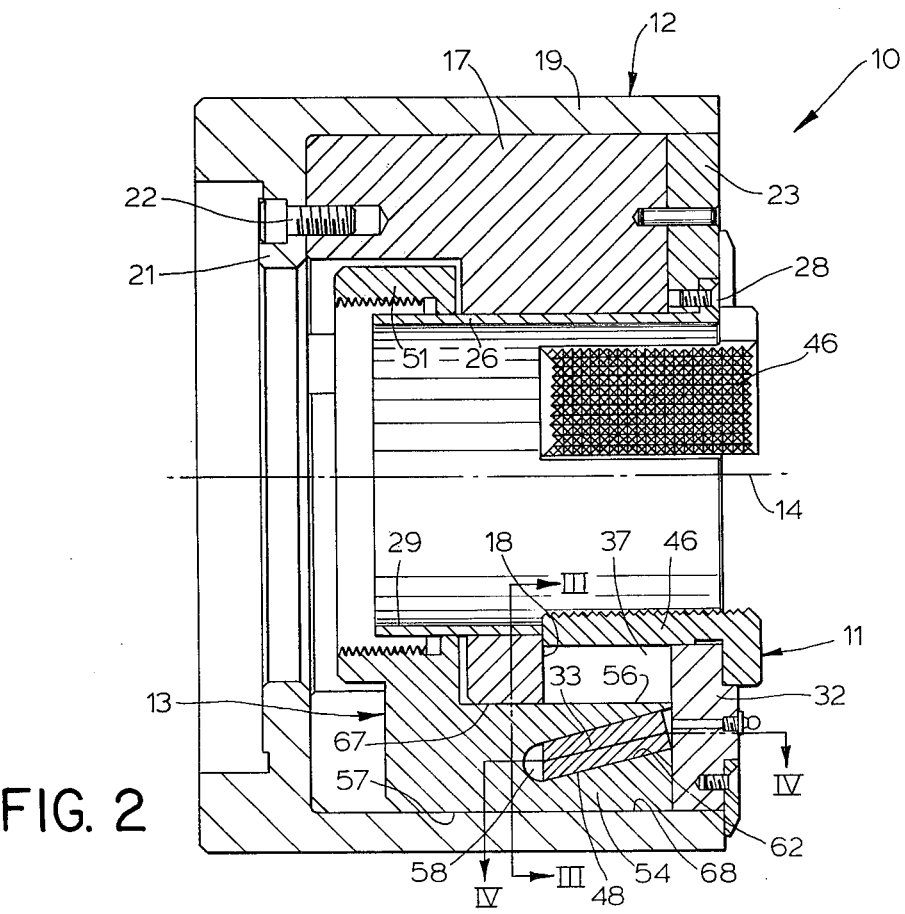
FIG. 2 is a sectional view taken along line II—II in FIG. 1.

Referring to the drawings, and particularly FIGS. 1 and 2, there is illustrated a jaw chuck 10 incorporating therein the features of the present invention. This jaw chuck includes a plurality, here three, of jaw assemblies 11 which are uniformly angularly spaced apart and are radially movably supported on a body structure 12. An actuator 13 is axially slidably supported within the body structure 12 for controlling the radial displacement of the jaw assemblies 11. The chuck 10 is adapted to be attached to a conventional machine tool, such as a lathe, by having the body structure 12 connected thereto by utilization of conventional structure, whereby the chuck 10 is thus disposed for rotation about its longitudinally extending axis 14.

The body structure 12 includes, as shown in FIG. 2, an inner substantially cylindrical, sleevelike body 17 which has three T-shaped grooves or slots 18 formed in the front face thereof, which slots extend radially between the inner and outer peripheries of the body. The inner body 17 is in turn surrounded and snugly embraced by an outer sleevelike body 19 which extends axially over the complete length of the inner body and, in fact, projects axially forwardly beyond the front face of the inner body. An annular flange 22 is integral with the outer body adjacent the rearward end thereof and projects radially inwardly so as to overlap the inner body, with the inner and outer bodies being fixedly secured together by means of screws 22. The inner body 17 also has a front plate 23 fixed thereto, as by screws 24. This plate 23, in the illustrated embodiment, is formed as three separate arcuate portions which extend angularly between each adjacent pair of jaw assemblies and function to slidably retain the jaw assemblies within the T-shaped slots 18, as explained hereinafter.

Body structure 12 also includes an inside sleeve 26 snugly disposed within the interior of the inner body 17. Sleeve 26 is provided with a segmented front flange 27 which is suitably secured, as by set screws 28, to the front plate 23. This inner sleeve 26 defines a central bore 29 which extends axially through the chuck and thus accommodates an elongated workpiece, such as a bar or tube.

The jaw assemblies 11 are identical and each includes a jaw carrier 31 which is radially slidably supported within a respective one of the slots 18. The jaw carrier 31 is basically of a two-piece construction and includes a blocklike carrier body 32 having a T-shaped bearing or wedge plate 33 removably mounted thereon.

The carrier body 32, as illustrated in FIGS. 4 and 7-8, has a pair of guide ribs 36 which project outwardly from opposite sides thereof and extend in parallel relationship. These guide ribs extend between the radially inner and outer ends of the body so that these ribs thus project in a radial direction when the jaw carrier is mounted within the respective slot 18. These guide ribs 36 are received in the outer head portion of the T-shaped slot 18 (as shown in FIG. 4) and are slidably confined within the slot by the segmented cover plate 23.

Carrier body 32 had a central slot 37 formed therein, which slot extends inwardly from the rear face 38 of the body. This slot extends radially through the body substantially in parallelism with the guide ribs 36, whereby the slot extends in the radial direction of the chuck when the carrier body is mounted within the slot 18. The slot 37 results in the carrier body 32 having opposed leg portions 39, and a further slot 41 is formed in these leg portions 39 and extends transversely with respect to the slot 37. The transverse slot 41 extends forwardly or inwardly at a small upward incline from the rear face 38, so that when the carrier body is slidably mounted within the chuck body, the slot 41 extends at a small angle with respect to the rotational axis 14. This small angle is designed to result in a self-locking relationship between the jaw carrier and the actuator, which self-locking arrangement is conventionally utilized in jaw chucks, and results in the slot 41 being preferably skewed at an angle of approximately 14° relative to the axis 14. The slot 41, as illustrated in FIGS. 7–8, extends inwardly into the body 32 through a distance substantially less than that of the slot 37, and in fact terminates just short of the guide ribs 36.

The T-shaped wedge plate 33 is mounted on the carrier body 32 by being slidably inserted into the slots 37 and 41. Specifically, the enlarged head portion of the T-shaped plate 33 is positioned within the skewed slot 41 and extends across the outer end of the slot 37, and the projecting tongue portion of the T-shaped plate 33 projects inwardly throughout substantially the full extent of the slot 37. The T-shaped bearing plate, when mounted on the carrier body 32, is thus disposed in a skewed or inclined relationship as determined by the slot 41. Wedge plate 33 is suitably fixed to the carrier body 32, as by means of set screws 43 which are threadably engaged within the leg portions 39 and project into small conical recesses 44 formed in the underside of the bearing plate. This mounting of the bearing plate 33 within the carrier body 32, and the presence of the central slot 37, results in the bearing plate having exposed upper and lower surfaces 47 and 48, respectively, which surfaces are cammingly or wedgingly acted upon for permitting desired radial displacement of the jaw assemblies and the transmission of a holding or clamping force thereto.

Each jaw assembly 11 also includes a jaw 46 of conventional construction. This jaw is releasably fixedly mounted to the respective carrier body 32 and, in the illustrated embodiment, is provided with a radially inwardly directed gripping surface adapted for engagement with a cylindrical workpiece.

The radial movement of the jaw assembly 11 is controlled by the axially movable actuator 13 which, as illustrated in FIGS. 5–6, includes a central ring or hub 51 which is internally threaded. This hub 51 is axially slidably confined within the inner body 17 and is suitably connected to an external power mechanism, such as a conventional drawbar mechanism employing a fluid pressure cylinder, for permitting powered axial displacement thereof. The actuator 13, as illustrated in FIG. 2, is confined within an annular recess so as to be axially movable through a limited distance, which distance is bounded by opposed abutment surfaces defined by the body structure 12.

The actuator 13 has three axially projecting wedges 52 fixedly associated therewith, which wedges 52 are uniformly angularly spaced apart and thus individually cooperate with a respective one of the jaw assemblies 11. Each wedge 52 is of a substantially L-shaped configuration and includes an inner mounting portion 53 which is secured to the hub 51 and projects radially thereform. An axially elongated wedge portion 54 then projects forwardly from the mounting portion 53. The wedge portion 54, in the illustrated embodiment, has a substantially rectangular cross section and has radially inner and outer bearing surfaces 56 and 57, respectively, formed thereon.

A slot 58 is formed in the wedge portion 54 and projects rearwardly from the front or free end thereof. This slot 58 is bounded by opposed substantially parallel wedging surfaces 61 and 62, which surfaces are transversely spaced apart by a distance which is only slightly greater than the thickness of the wedge plate 33 to enable the latter to be slidably accommodated within the slot 58. The thickness of the wedge portion 54, as measured circumferentially with respect to the rotational axis of the chuck, is substantially equal to but slightly less than the width of the central slot 37 formed in the carrier body, whereby the wedge portion 54 can thus be axially and radially slidably moved within the slot 37.

The slot 58 is also disposed in a skewed or inclined relationship with respect to the axis 14, which inclined relationship is identical to that of the slot 41 formed in the carrier body 32.

To axially slidably guide yet closely confine the actuator 13, the inner cylindrical body 17 has three axially extending slots 66 formed therein. As illustrated in FIG. 3, these slots 66 project inwardly from the outer peripheral surface of the inner body 17 and each closely axially slidably confines one of the wedge portions 54 therein. Each slot 66 defines a bottom wall 67 formed in the inner body 17, which bottom wall acts as a slidable bearing surface for slidably engaging the bearing surface 56 formed on the respective wedge portion 54. The other bearing surface 57 on the wedge portion 54 is slidably supported on the inner peripheral surface 68 of the outer body 19. The bearing surface 57 is normally generated on a radius substantially equal to that of the surface 68 so as to insure a proper slidable bearing engagement therewith.

OPERATION

Turning now to the operation of the chuck, same is illustrated in FIGS. 1 and 2 in a released position wherein the jaw assemblies 11 are disposed in their radially outermost positions. After a workpiece has been inserted through the bore 29, then the drawbar assembly is actuated to axially displace the actuator 13 rearwardly (leftwardly in FIG. 2). This results in the wedge portions 54 being rearwardly axially displaced whereby the outer wedging surface 62 associated with each slot 58 thus slidably bears against the under bearing surface 48 associated with the respective bearing plate 33. Each jaw carrier 31 is thus slidably displaced radially inwardly along the respective slot 18 until the jaw 46 grippingly engages the exterior of the workpiece. Continual pressure or pulling force is exerted leftwardly on the actuator 13 which, reacting through the wedge portions 54 onto the bearing plates 33, thus causes the jaw assemblies to be securely maintained in gripping engagement with the workpiece so as to permit rotation of the workpiece in sychronization with the chuck.

During high speed rotation of the chuck and the workpiece mounted thereon, which rotation may be in the order of 4,000 revolutions per minute, the centrifugal force exerted on the jaw assemblies 11 is substantial and thus has a tendency in known chuck constructions to reduce the holding force between the jaws and the workpiece. In the present invention, however, the centrifugal force imposed on the jaw assemblies 11 is effectively counterbalanced by the structural relationship which exists between the jaw assemblies and the chuck body. More specifically, the centrifugal force imposed on each jaw carrier assembly 11 is transmitted by the wedge plate 33 against the bearing surface 62 associated with the wedge portion 54. This wedge portion 54 is, however, disposed with its outer bearing surface 57 snugly slidably engaged with the inner peripheral surface 68 of the outer body 19. Since this outer body 19 comprises a continuous sleeve which snugly embraces and encircles the inner body 17 and closely confines the wedge portions 54, the outer body 19 thus possesses substantial strength and rigidity and accordingly is able to withstand the centrifugal force which is transmitted thereto from the jaw carriers through the wedge portions. The gripping force which exists between the jaws and the workpiece is thus not significantly affected by centrifugal forces at high rotational speeds, so that proper gripping of the workpiece at such speeds can be achieved.

In addition to the ability of the chuck to withstand large centrifugal forces, the chuck of this invention also has been observed to result in a significantly improved force transfer between the actuator and the jaw carriers, thereby permitting development of a greater holding force in relationship to the utilization of an actuating force of preselected magnitude. More specifically, the wedge portion 54 cammingly or wedgingly engages the jaw carrier 31 at a location which is disposed substantially centrally of the body 32 due to the manner in which the wedge portion 54 projects into the central slot 37 and cooperates with the bearing plate 33. This central transfer of forces from the wedge to the jaw carrier thus greatly minimizes any twisting or tilting moments imposed on the jaw carrier, thereby minimizing both the friction forces imposed on the jaw carrier and the reaction forces which exist between the jaw carrier and the body structure. In this manner, a greater percentage of the actuating force is thus available for application directly to the jaw carrier so as to be effective for increasing the clamping force between the jaw and the workpiece.

In static testing conducted on the chuck of the present invention, it has been experimentally observed that the holding force between the jaw and the workpiece, when utilizing the improved jaw carrier structure of this invention, is between 60 and 65% of the actuating force imposed on the jaw carrier by the wedge. On the other hand, conventional 90° chucks (that is chucks having radially movable jaws) have normally possessed efficiency of only approximately 50%. The structure of this invention has thus been observed to result in an increase of between 20% and 30% in terms of the holding force efficiency. This is obviously significant since it permits the developement of a substantially increased holding force or, in the alternative, permits a minimization in the chuck size and/or the actuating force.

A further advantageous feature of this invention results from the fact that the wear plate 33 is removably mounted on the carrier body 32. Thus, if this plate 33 should experience excessive wear due to its slidable engagement with the respective wedge portion 54, then the chuck can be suitably repaired merely by replacing the plate 33. The carrier body 32 can itself be reused without requiring a complete replacement thereof.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a rotatable jaw chuck construction having body means, a plurality of jaw assemblies radially movably supported on said body means and adapted for gripping engagement with a workpiece, and axially movable actuator means interconnected to said jaw assemblies for radially displacing same into clamping engagement with a workpiece, comprising the improvement wherein:
   said body means includes an inner sleevelike body having a plurality of guide slots formed therein and spaced circumferentially therearound, said guide slots extending substantially radially with respect to the longitudinal axis of said inner body and having said jaw assemblies slidably supported therein;
   said actuator means including a plurality of slidable actuating wedges, each wedge being axially slidably supported on said body means and disposed in slidable camming engagement with a respective said jaw assembly for causing radial displacement thereof in response to axial displacement of said wedge; and
   said body means including an outer sleevelike body fixed with respect to the inner body and disposed in snug surrounding relationship thereto, said outer body having an inner peripheral surface which axially slidably bearingly engages with a radially outer bearing surface formed on said actuator wedge, whereby centrifugal forces imposed on the jaw assembly are transmitted therefrom through said wedge to said outer body.

2. A chuck construction according to claim 1, wherein said actuator means includes an annular hub portion concentrically disposed with respect to the inner body, and said plurality of wedges being fixed to said hub portion and projecting axially thereof for axial slidable engagement with the inner and outer bodies.

3. A chuck construction according to claim 1, wherein the guide slots extend radially of the inner body in substantially perpendicular relationship to said longitudinal axis, said wedges being positioned in radially spaced relationship from said longitudinal axis and slidably movable in an axial direction substantially parallel to said longitudinal axis, each said wedge having a free end portion which projects into the respective guide slot adjacent the radially outer end thereof, said outer body substantially closing the radially outer end of said guide slot and having the inner peripheral surface thereof disposed in slidable bearing engagement with the free end portion of said wedge, whereby centrifugal forces developed by said jaw assembly are transmitted radially outwardly from the jaw assembly to the wedge and then directly to the surrounding outer body.

4. A chuck construction according to claim 3, wherein the jaw assembly includes a jaw carrier radially slidably supported within a respective said guide slot, and said jaw carrier and wedge having means coacting therebetween for causing radial displacement of the respective jaw carrier in response to axial displacement of the respective wedge, said last-mentioned means including a slot and a cooperating wedge plate, each of which extends at a small angle relative to said longitudinal axis.

5. A chuck construction according to claim 4, wherein said slot is formed in said wedge and projects inwardly from the free end thereof, and said wedge plate being fixedly associated with the respective jaw carrier.

6. A chuck construction according to claim 5, wherein said actuator means includes an annular hub portion concentrically disposed with respect to the inner body, and said plurality of wedges being fixed to said hub portion and projecting axially thereof for axial slidable engagement with the inner and outer bodies.

7. A chuck construction according to claim 1, wherein said jaw assembly includes a jaw carrier radially slidably supported within a respective said guide slot, said jaw carrier including a carrier body having a substantially U-shaped configuration and defining a central slot which extends radially through the carrier body, said central slot projecting axially inwardly into the carrier body for a limited extent, whereby said central slot results in the carrier body having opposed substantially parallel leg portions disposed on opposite sides of an axial plane which passes through both the longitudinal axis and the center of the carrier body, said jaw carrier also including a wedge plate fixedly secured to the carrier body and extending across said central slot, said wedge plate being positioned between the radially inner and outer ends of the carrier body and being inclined at a small angle relative to said longitudinal axis, and said wedge having a free end portion axially slidably accommodated within said central slot, said wedge having a narrow inclined slot formed inwardly from the free end thereof, said narrow slot accommodating therein that portion of the wedge plate which spans said central slot, whereby axial displacement of said wedge results in radial displacement of the respective jaw carrier.

8. A chuck construction according to claim 7, including releasable means fixedly attaching the wedge plate to the carrier body for permitting removal and replacement of the wedge plate.

9. In a rotatable jaw chuck construction having substantially cylindrical sleevelike body means rotatable about its longitudinal axis, said body means having a plurality of angularly spaced guide slots formed therein, said guide slots extending radially of said body means in perpendicular relationship to said axis, a jaw carrier radially slidably supported within each said slot, and an actuator means axially supported on said body means for causing radial displacement of the respective jaw carrier in response to axial displacement of the actuator means, said actuator means and the respective jaw carrier having wedge means coacting therebetween, comprising the improvement wherein:

said jaw carrier includes a carrier body radially slidably supported with a respective said guide slot, said carrier body having a central slot formed therein and communicating with one axial end of the carrier body, said central slot projecting through said carrier body in a direction parallel with the elongated direction of the respective guide slot, whereby said carrier body has a generally U-shaped configuration and includes substantially parallel leg portions which are disposed uniformly on opposite sides of an axial plane which passes through both the longitudinal axis and the center of the carrier body;

said jaw carrier also including a wedge plate fixed to the carrier body and extending across said central slot between said opposed leg portions, said wedge plate being inclined at a small angle relative to said longitudinal axis;

said actuator means including a wedge portion axially slidably supported on said body means and projecting into said central slot, said wedge portion having an inclined slot formed therein, and said wedge plate being slidably accommodated within said inclined slot.

10. A chuck construction according to claim 9, wherein said central slot projects axially through said carrier body over a major portion of the length thereof as measured in the axial direction of the chuck construction, and said wedge portion being axially slidably movable into said central slot to substantially the full depth thereof so that the force transfer between the wedge portion and said jaw carrier occurs substantially centrally of the jaw carrier.

11. A chuck construction according to claim 9, including threaded fastener means coacting between said carrier body and said wedge plate for fixedly but removably securing said wedge plate to said carrier body.

12. A chuck construction according to claim 9, wherein said carrier body includes a transverse slot formed inwardly from the same axial face thereof as said central slot, said transverse slot extending inwardly into each of said leg portions through a distance substantially less than the depth of said central slot, said transverse slot being inclined at said small angle relative to the longitudinal axis, and said wedge plate being of a generally T-shaped configuration having a wider head portion positioned within said transverse slot and extending across said central slot and an elongated central tongue portion positioned within said central slot.

* * * * *

UNITED STATES PATENT AND TRADEMARK OFFICE
CERTIFICATE OF CORRECTION

PATENT NO. : 4 123 075

DATED : October 31, 1978

INVENTOR(S) : William V. Rosewarne et al

It is certified that error appears in the above-identified patent and that said Letters Patent are hereby corrected as shown below:

Column 9, Line 45; after "axially" insert ---movably---.

Column 10, Line 2; change "with" to ---within---.

*Signed and Sealed this*

*Twenty-seventh* Day of *February 1979*

[SEAL]

Attest:

RUTH C. MASON
*Attesting Officer*

DONALD W. BANNER
*Commissioner of Patents and Trademarks*